(12) United States Patent
Hallenbeck

(10) Patent No.: US 7,909,968 B2  
(45) Date of Patent: Mar. 22, 2011

(54) APPARATUS AND METHOD FOR THE ELECTROLYSIS OF WATER

(75) Inventor: John R. Hallenbeck, Tucson, AZ (US)

(73) Assignee: Advanced R F Design, L.L.C., Tucson, AZ (US)

( * ) Notice: Subject to any disclaimer, the term of this patent is extended or adjusted under 35 U.S.C. 154(b) by 1164 days.

(21) Appl. No.: 11/598,941

(22) Filed: Nov. 13, 2006

(65) Prior Publication Data

US 2008/0110750 A1    May 15, 2008

(51) Int. Cl.  
*C25B 9/00* (2006.01)

(52) U.S. Cl. ............... 204/275.1; 204/242; 205/340; 205/628; 205/637

(58) Field of Classification Search .......... 205/628–639, 205/340; 204/242, 275.1  
See application file for complete search history.

(56) References Cited

U.S. PATENT DOCUMENTS

| | | | |
|---|---|---|---|
| 2,986,133 A | | 5/1961 | Mattson |
| 3,608,660 A | | 9/1971 | Smith et al. |
| 4,107,008 A | * | 8/1978 | Horvath .................. 205/339 |
| 4,265,721 A | * | 5/1981 | Hackmyer ............... 205/340 |
| 4,336,122 A | * | 6/1982 | Spirig ..................... 204/222 |
| 4,605,604 A | | 8/1986 | Pollack et al. |
| 5,105,773 A | | 4/1992 | Cunningham et al. |
| 5,679,236 A | | 10/1997 | Poschl |
| 6,054,844 A | | 4/2000 | Frank |
| 6,977,120 B2 | | 12/2005 | Chou et al. |
| 7,459,071 B2 | * | 12/2008 | Omasa .................... 205/628 |
| 2002/0197282 A1 | * | 12/2002 | Mohseni et al. ......... 424/400 |
| 2003/0116427 A1 | * | 6/2003 | Ding et al. ............ 204/192.17 |

\* cited by examiner

*Primary Examiner* — Alexa D. Neckel  
*Assistant Examiner* — Nicholas A. Smith  
(74) *Attorney, Agent, or Firm* — Dale F. Regelman; Quarles & Brady LLP

(57) ABSTRACT

An electrolysis apparatus for water is disclosed. The apparatus comprises an enclosure, a first electrode disposed within the enclosure, a second electrode disposed within the enclosure, and at least one electromagnetic energy radiator disposed within the enclosure. The apparatus further comprises a power source disposed external to the enclosure, where that power source is interconnected with the first electrode such that the first electrode comprises a cathode, and where the power source is interconnected with the second electrode such that the second electrode comprises an anode. The apparatus further comprises at least one oscillator disposed external to the enclosure, where each oscillator is interconnected to a different electromagnetic energy radiator.

17 Claims, 8 Drawing Sheets

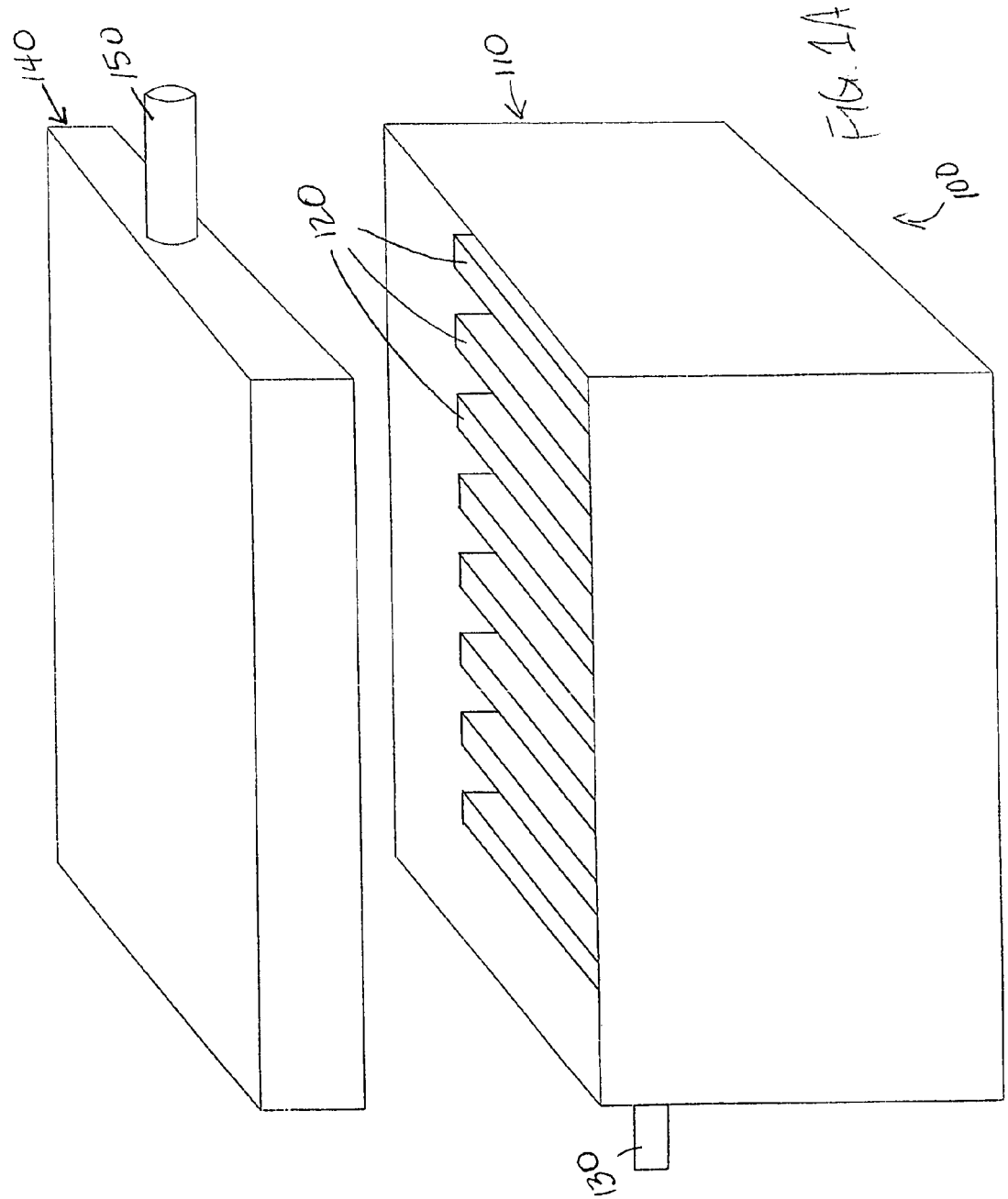

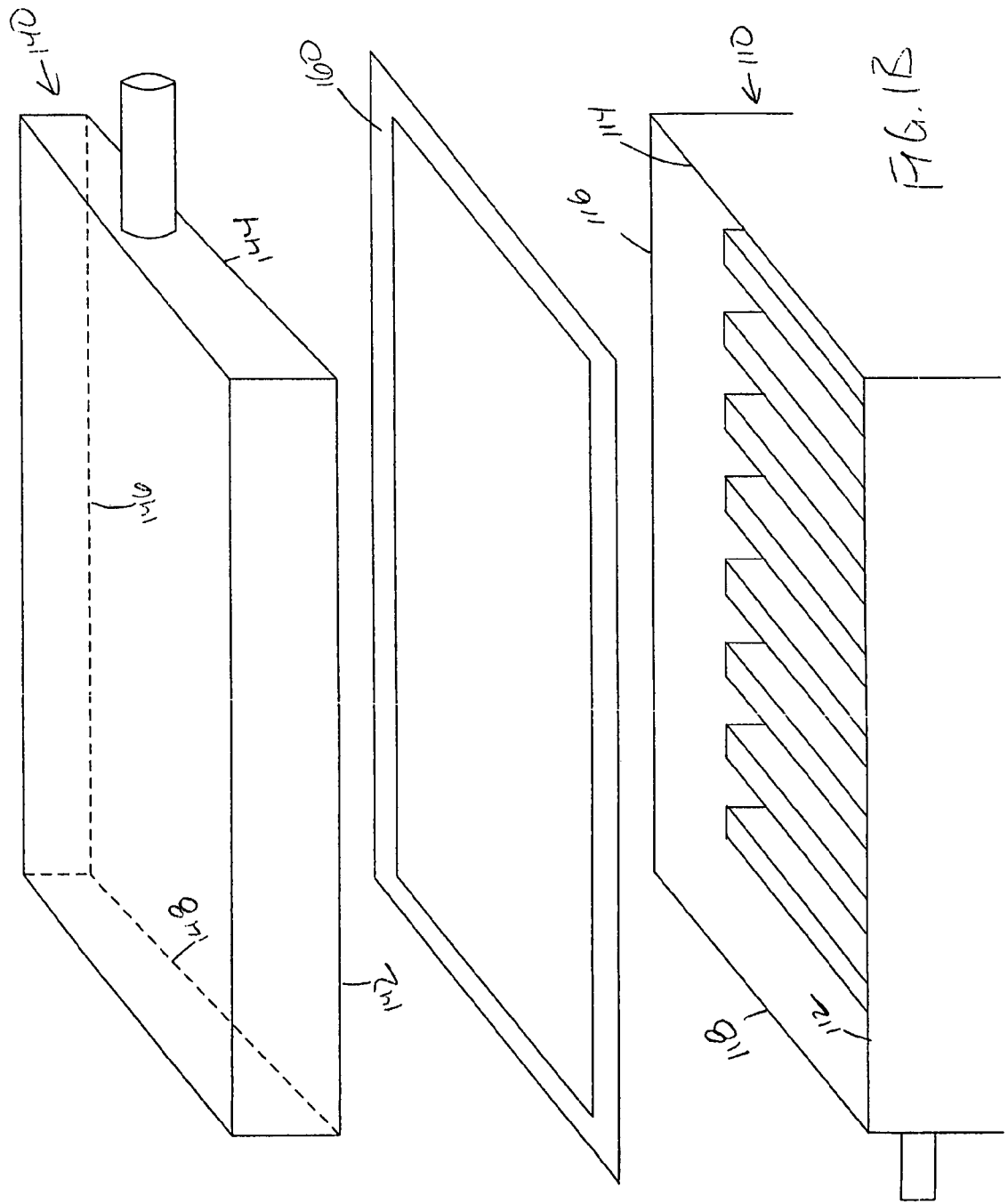

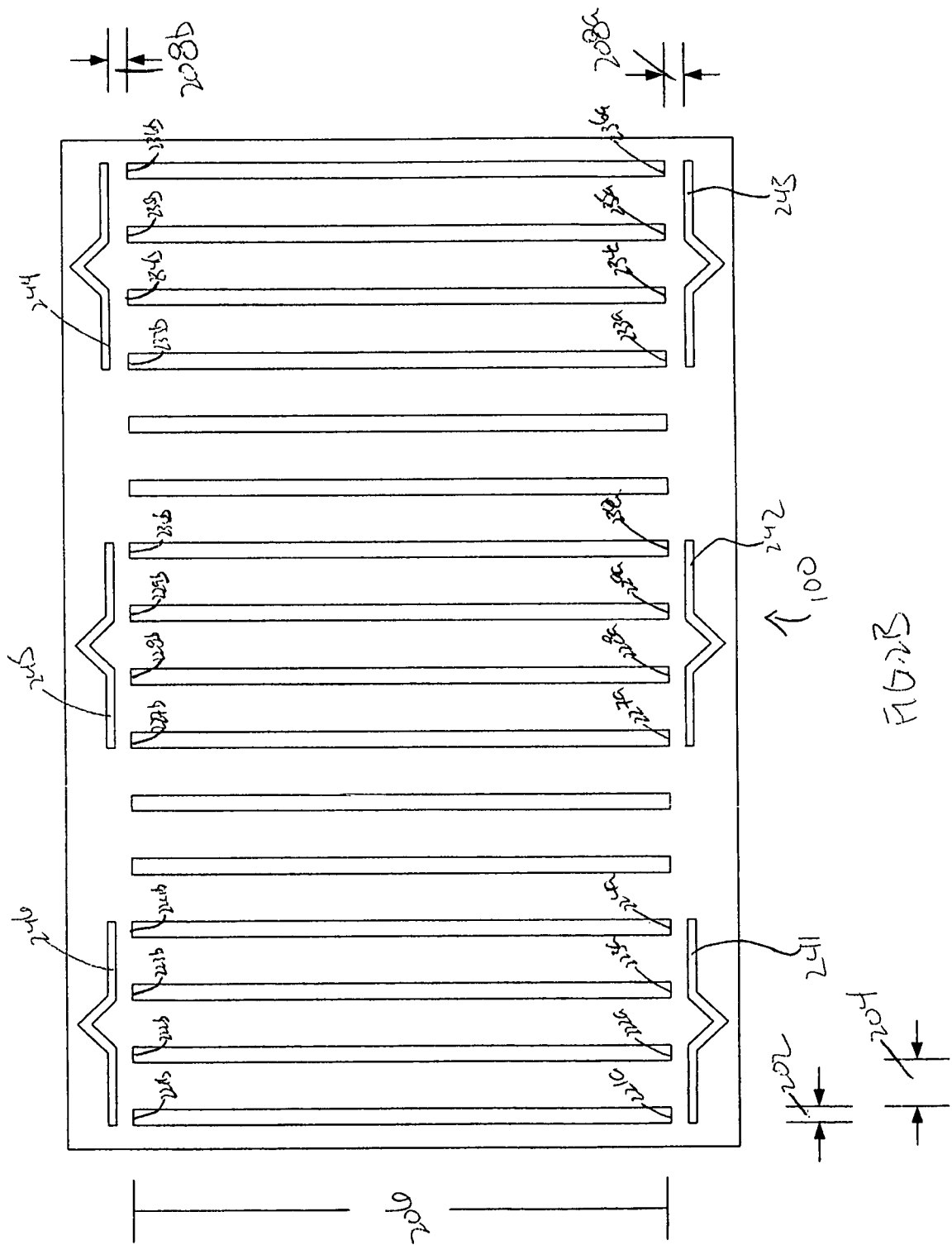

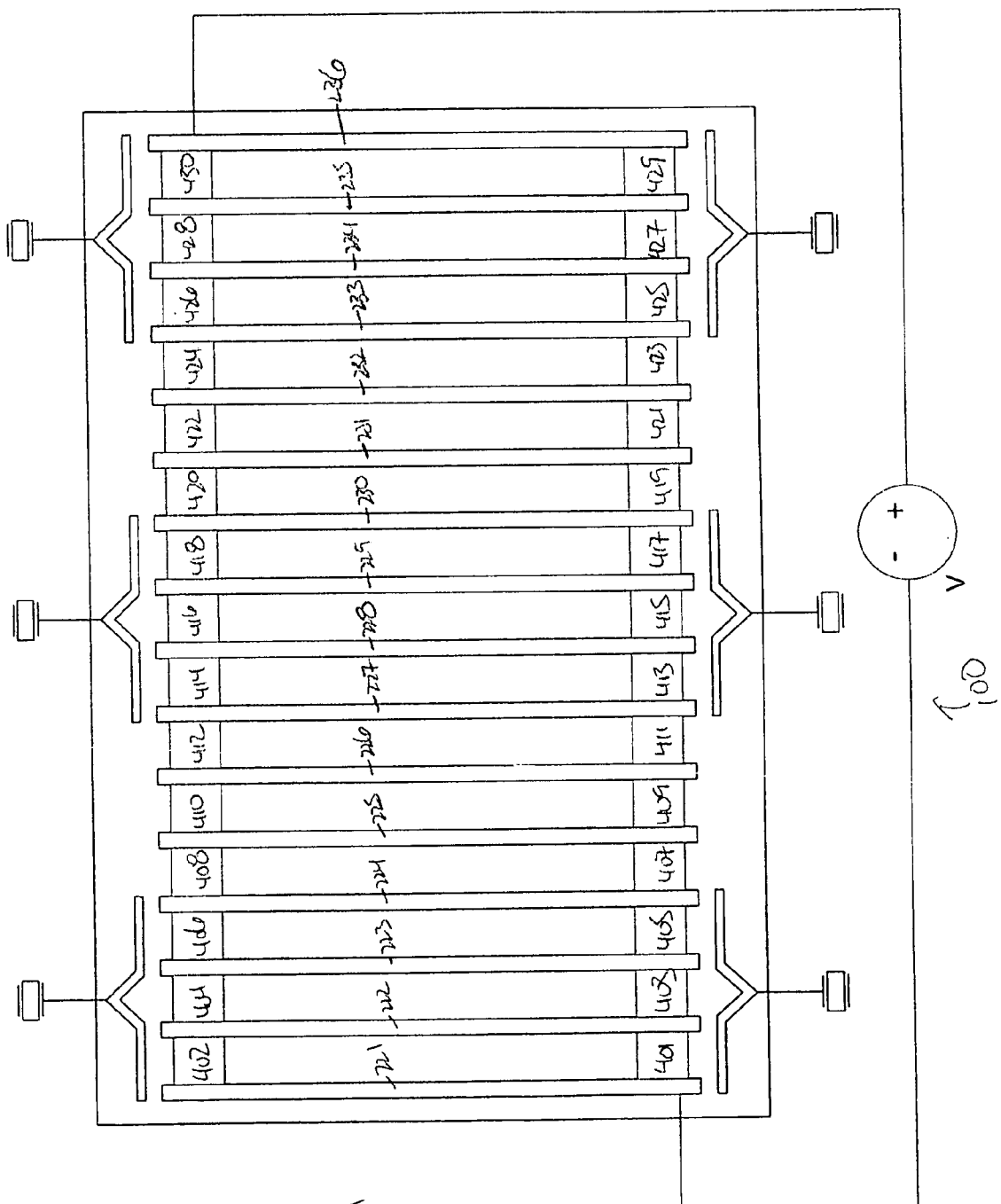

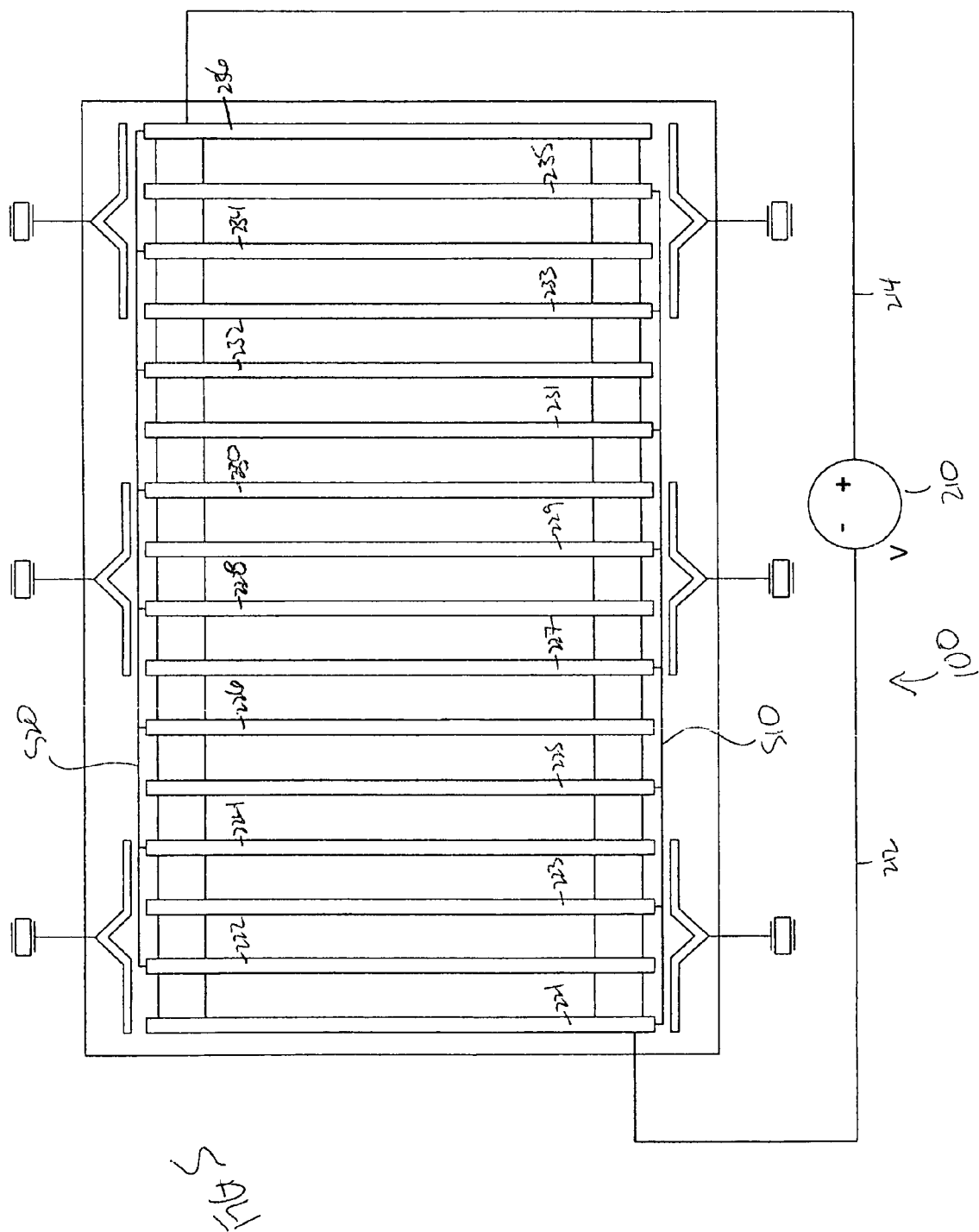

APPARATUS AND METHOD FOR THE ELECTROLYSIS OF WATER

FIELD OF THE INVENTION

The invention is directed to an apparatus and method for the electrolysis of water to produce hydrogen gas and oxygen gas.

BACKGROUND OF THE INVENTION

Modern societies are critically dependent on energy. All aspects of modern life, ranging from the generation of electricity to the powering of automobiles, require the consumption of energy.

The desired attributes of any fuel or energy source include low cost, plentiful supply, renewability, safety, and environmental compatibility. Hydrogen is currently the best prospect for these desired attributes and offers the potential to greatly reduce dependence on conventional fossil fuels. Hydrogen is the most prevalent element in the universe and, if realized, offers an inexhaustible fuel source to meet today's increasing energy demands.

In addition to being plentiful and widely available, hydrogen is also a clean fuel source. Combustion of hydrogen produces water as a by-product. Utilization of hydrogen as a fuel source thus avoids the unwanted generation of the carbon and nitrogen-based greenhouse gases that are responsible for global warming as well as the unwanted production of soot and other carbon-based pollutants in industrial manufacturing. Hydrogen truly is a green energy source. The use of hydrogen as an energy source has been limited by the large energy consumption for its production from water, as illustrated in Equation (i).

$$2\ H_2O \longrightarrow 2H_2 + O_2 \qquad (i)$$

As a general matter, prior art electrolyzers consume 4.0 kWh per cubic meter of hydrogen gas produced. Prior art electrolysis apparatus and methods utilize a voltage of 1.6-2.0 V and current strength of dozens and hundreds of amperes. What is needed is an apparatus and method to more cost-effectively produce hydrogen from water.

SUMMARY OF THE INVENTION

Applicant's invention comprises an electrolysis apparatus. Applicant's apparatus comprises an enclosure comprising a bottom, a plurality of walls attached to the bottom and extending upwardly therefrom, and a top assembly removeably attached to the distal ends of each of the plurality of walls, such that the bottom, plurality of walls, and top assembly define an enclosed space. Applicant's apparatus further comprises a first electrode disposed within the enclosed space, a second electrode disposed within the enclosed space, and at least one electromagnetic energy radiator disposed within the enclosed space.

Applicant's apparatus further comprises a power source disposed external to the enclosure, where that power source is interconnected with the first electrode such that the first electrode comprises a cathode, and where the power source is interconnected with the second electrode such that the second electrode comprises an anode. Applicant's apparatus further comprises at least one oscillator disposed external to the enclosure, where each oscillator is interconnected to a different electromagnetic energy radiator.

BRIEF DESCRIPTION OF THE DRAWINGS

The invention will be better understood from a reading of the following detailed description taken in conjunction with the drawings in which like reference designators are used to designate like elements, and in which:

FIG. 1A is a perspective view of a first embodiment of Applicant's apparatus, wherein the top assembly is shown removed from a five-sided housing;

FIG. 1B is a perspective view of a second embodiment of Applicant's apparatus which comprises a sealing gasket disposed between the top assembly and the housing;

FIG. 2A is a top view of a third embodiment of Applicant's apparatus, wherein the top assembly has been removed;

FIG. 2B is a top view showing a portion of the apparatus of FIG. 2A;

FIG. 4 is a top view of a fourth embodiment of Applicant's apparatus, wherein top assembly has been removed; and FIG. 5 is a top view of a fifth embodiment of Applicant's apparatus, wherein the top assembly has been removed.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1C:
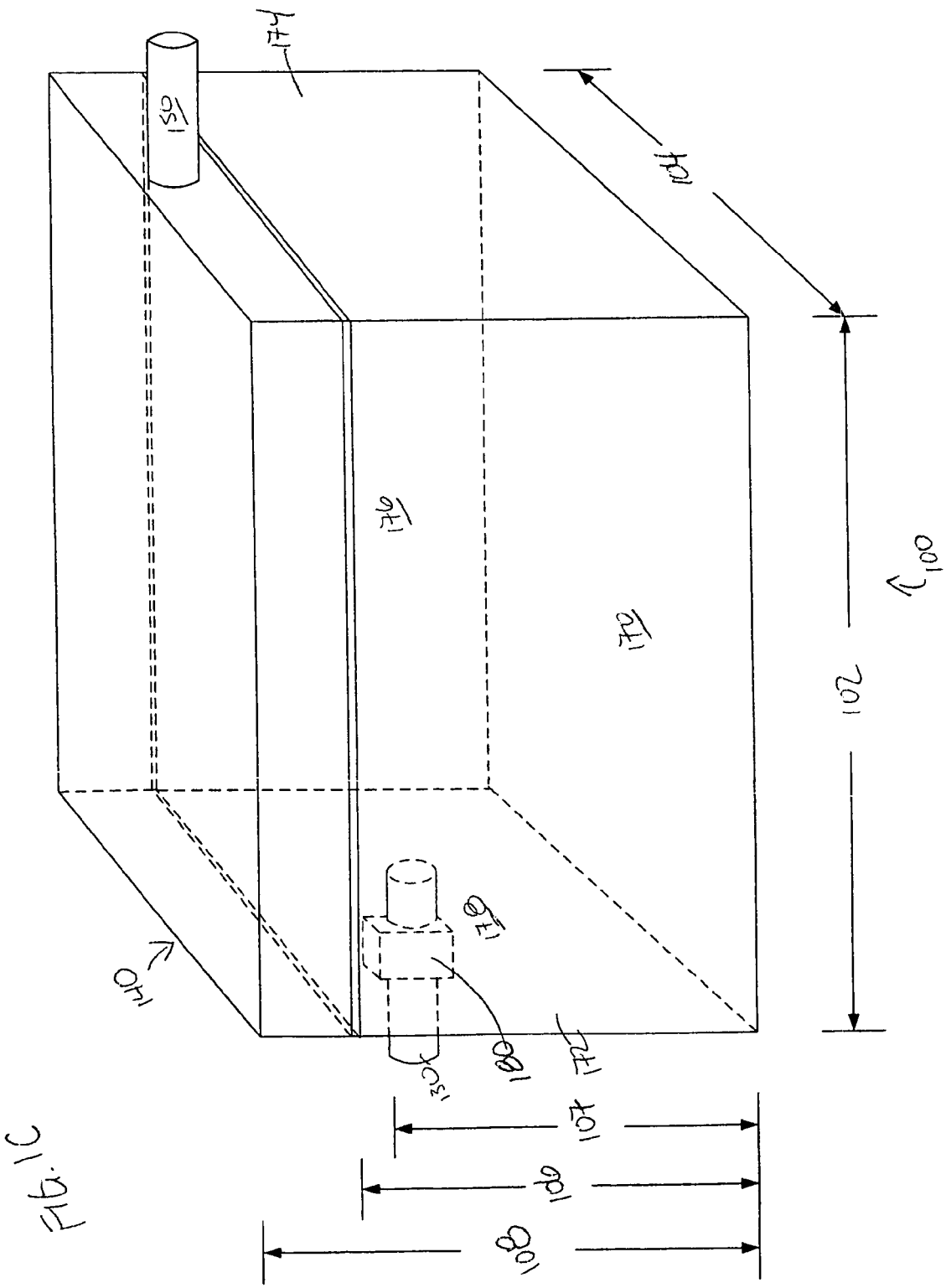
FIG. 1C is a perspective view of the embodiment of FIG. 2 showing the top assembly removeably attached to the housing to form an enclosure defining an enclosed space.
Figure 7A:
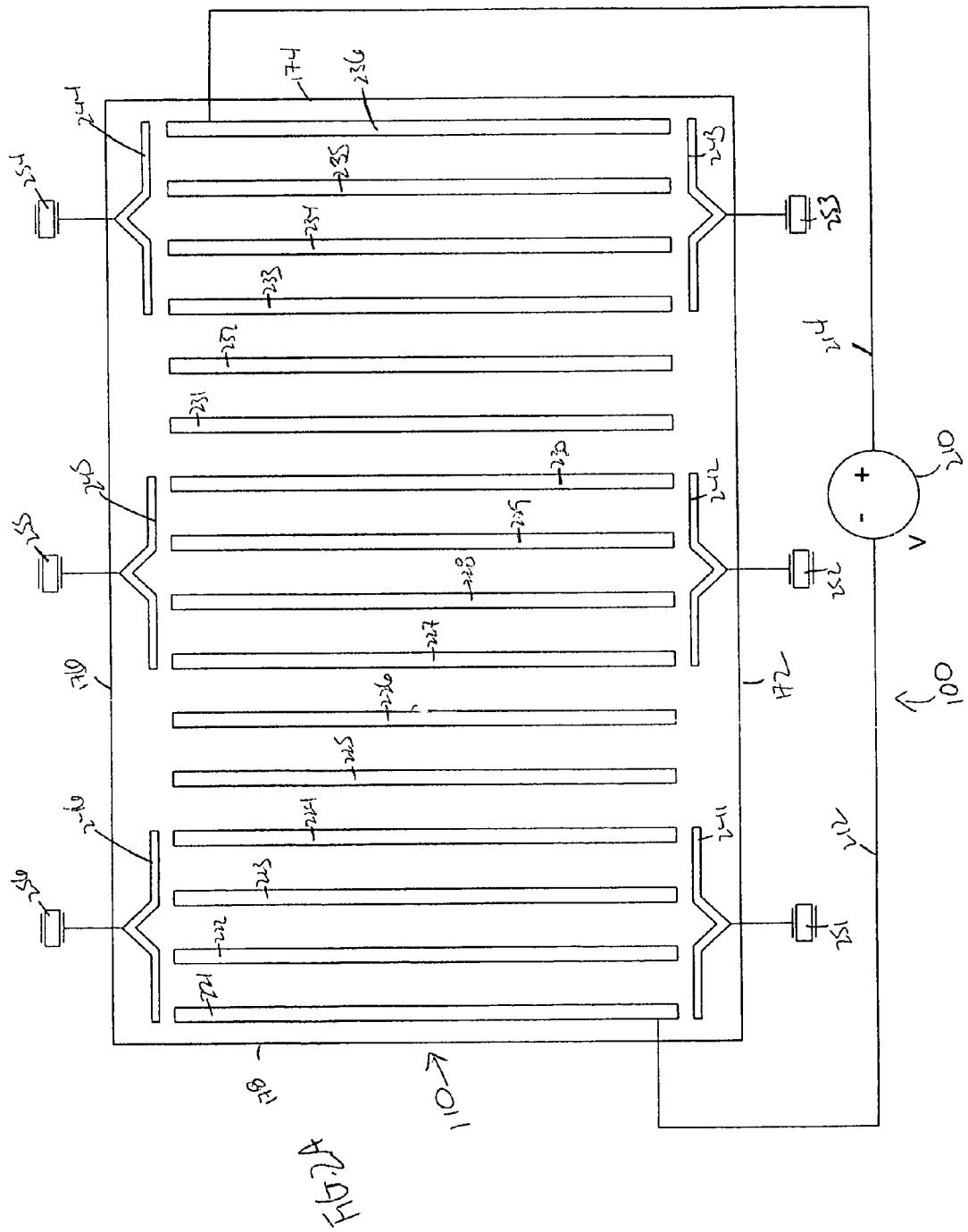

Referring now to FIG. 1A, Applicant's electrolysis apparatus 100 comprises housing 110 in combination with top assembly 140. Housing 110 comprises water input port 130 and float valve assembly 180 (FIG. 1C). A plurality of electrodes 120 are disposed within housing 110. Water inlet port 130 is interconnected with a source of water, and is positioned such that each of the plurality of electrodes 120 remain covered by water.

In the illustrated embodiment of FIG. 1A, plurality of electrodes 120 comprises 8 electrodes. In other embodiments, plurality of electrodes 120 comprises fewer than 8 electrodes. In still other embodiments, plurality of electrodes 120 comprises more than 8 electrodes.

Top assembly 140 comprises gas outlet 150. The mixture of hydrogen gas and oxygen gas formed by the electrolysis of water within apparatus 100 flows outwardly through gas outlet 150. In certain embodiments, one or more gas conduits interconnect gas outlet 150 and one or more gas inlet portions of an internal combustion engine.

Referring now to FIG. 1B, top assembly 140 can be releaseably attached to housing 110 to form a water-tight seal. In certain embodiments, a sealing gasket 160 is disposed between top edges 112, 114, 116, and 118, of housing 110 and bottom edges 142, 144, 146, and 148, of top assembly 140.

Referring now to FIG. 1C, walls 172, 174, 176, and 178, are attached to bottom 170 and extend upwardly therefrom. Top assembly is removeably attachable to the distal ends 112, 114, 116, and 117, of walls 172, 174, 176, and 178, respectively. Bottom 170, wall 172, wall 174, wall 176, wall 178, and top assembly 140, in combination define an enclosed space.

In certain embodiments, bottom 170, and walls 172, 174, 176, 178, are formed from one or more rigid materials selected from the group consisting of wood, ceramic, metal, glass, and combinations thereof. In certain embodiments, bottom 170, and walls 172, 174, 176, 178, are formed from one or more polymeric materials such as and without limitation polyethylene, polypropylene, polystyrene, polycarbonate, polyetheretherketone, mixtures thereof, and the like.

In the illustrated embodiment of FIGS. 1A, 1B, and 1C, apparatus 100 comprises four walls interconnecting the bottom and top assembly. As a general matter, Applicant's apparatus 100 comprises 3 or more walls interconnecting a bottom and a top to define an enclosed space. In certain embodiments, that enclosed space comprises a volume of 1 cubic foot. In other embodiments, that enclosed space comprises a volume less than 1 cubic foot. In still other embodiments, that enclosed space comprises a volume greater than 1 cubic foot.

In the illustrated embodiment of FIG. 1C, Applicants' apparatus 100 comprises a length 102, width 104, and height 108. As a general matter, length 102, width 104, and height 108, are substantially equal. By "substantially equal," Applicant means the same plus or minus about ten percent (10%).

In embodiments wherein Applicant's apparatus 100 provides fuel for an internal combustion engine disposed in a wheeled vehicle, length 102 is between about 12 inches and about 16 inches, width 104 is between about 12 inches and about 16 inches, and height 108 is between about 12 inches and about 16 inches. In these embodiments, housing 110 comprises length 102, width 104, and height 106, wherein height 106 is between about 8 inches and about 12 inches.

The top of water input port 130 is disposed a distance 107 from bottom 170. Float valve assembly 180 maintains the level of water disposed within apparatus 100 at a depth equal to distance 107 from the bottom 170. In certain embodiments, distance 107 is [(0.9)×(height 106)]. For example, in certain embodiments height 106 is about 8 inches and distance 107 is about 7 inches.

In the illustrated embodiment of FIG. 2A, the plurality of electrodes 120 (FIG. 1) comprises electrodes 221, 222, 223, 224, 225, 226, 227, 228, 229, 230, 231, 232, 233, 234, 235, and 236. In certain embodiments, each of electrodes 221, 222, 223, 224, 225, 226, 227, 228, 229, 230, 231, 232, 233, 234, 235, and 236, is formed from a material selected from the group consisting of lead, copper, tin, nickel, and combinations thereof.

In certain embodiments, one or more of the plurality of electrodes comprises Nickel (II) hydroxide. In certain embodiments, one or more of the plurality of electrodes comprises Nickel (III) oxide-hydroxide.

Applicants' apparatus 200 further comprises power source 210. In certain embodiments, power source 210 provides DC power having a voltage $V_{DC}$ between about 8 volts and about 48 volts to at least one anode electrode and to at least one cathode electrode. In certain embodiments, power source 210 provides 36 $V_{DC}$ power to at least one anode electrode and to at least one cathode electrode.

In the illustrated embodiment of FIG. 2A, power conduit 212 interconnects power source 210 with electrode 221 such that electrode 221 comprises a cathode. Power conduit 214 interconnects power source 220 with electrode 236 such that electrode 236 comprises an anode.

As a general matter, Applicants' electrolysis apparatus 100 comprises (N) electromagnetic energy radiators, wherein (N) is greater than or equal to 1 and less than or equal to 12, and wherein in operation each of those (N) electromagnetic energy radiators emits electromagnetic energy comprising a different frequency. In the illustrated embodiment of FIG. 2A, Applicants' electrolysis apparatus 100 comprises six electromagnetic energy radiators, namely electromagnetic energy radiators 241, 242, 243, 244, 245, and 246.

In the illustrated embodiment of FIG. 2A, electromagnetic energy radiators 241, 242, and 243, are disposed adjacent to wall 172. In the illustrated embodiment of FIG. 2A, electromagnetic energy radiators 244, 245, and 246, are disposed adjacent to wall 176. In other embodiments, one or more electromagnetic energy radiators each comprise a portion of one or more of the plurality of walls of apparatus 100. For example, in certain embodiments wherein one or more of walls 172, 174, 176, and/or 178, are formed from one or more non-electrically-conducting materials, one or more electromagnetic radiators are disposed in wall 172, and/or wall 174, and/or wall 176, and/or wall 178.

In certain embodiments, one or more of Applicants' (N) electromagnetic energy radiators are formed from a metal selected from the group consisting of iron, copper, zinc, nickel, lead, tin, and combinations thereof. In certain embodiments, one or more of Applicants' (N) electromagnetic energy radiators comprise zinc.

In the illustrated embodiment of FIG. 2A, electromagnetic energy radiator 241 is interconnected with oscillator 251, wherein oscillator 251 provides first energy comprising a first frequency and a first power level. In certain embodiments, oscillator 251 further comprises a power amplifier portion. In certain embodiments, oscillator 251 further comprises a power amplifier portion. In certain embodiments, the first power level is between about 1 watt and about 1000 watts. In certain embodiments, the first power level is about 600 watts.

Electromagnetic energy radiator 242 is interconnected with oscillator 252, wherein oscillator 252 provides second energy comprising a second frequency and a second power level. In certain embodiments, oscillator 252 further comprises a power amplifier portion. In certain embodiments, the second power level is between about 1 watt and about 1000 watts. In certain embodiments, the second power level is about 600 watts.

Electromagnetic energy radiator 243 is interconnected with oscillator 253, wherein oscillator 253 provides third energy comprising a third frequency and a third power level. In certain embodiments, oscillator 253 further comprises a power amplifier portion. In certain embodiments, the third power level is between about 1 watt and about 1000 watts. In certain embodiments, the third power level is about 600 watts.

Electromagnetic energy radiator 244 is interconnected with oscillator 254, wherein oscillator 254 provides fourth energy comprising a fourth frequency and a fourth power level. In certain embodiments, oscillator 254 further comprises a power amplifier portion. In certain embodiments, the fourth power level is between about 1 watt and about 1000 watts. In certain embodiments, the fourth power level is about 600 watts.

Electromagnetic energy radiator 245 is interconnected with oscillator 255, wherein oscillator 255 provides fifth energy comprising a fifth frequency and a fifth power level. In certain embodiments, oscillator 255 further comprises a power amplifier portion. In certain embodiments, the fifth power level is between about 1 watt and about 1000 watts. In certain embodiments, the fifth power level is about 600 watts.

Electromagnetic energy radiator 246 is interconnected with oscillator 256, wherein oscillator 256 provides sixth energy comprising a sixth frequency and a sixth power level. In certain embodiments, oscillator 256 further comprises a power amplifier portion. In certain embodiments, the sixth power level is between about 1 watt and about 1000 watts. In certain embodiments, the sixth power level is about 600 watts.

In certain embodiments, oscillators 251, 252, 253, 254, 255, and 256, comprise a single device, in optional combination with a power amplifier, wherein that single device is capable of providing a plurality of outputs each comprising a different frequency, wherein each of those plurality of outputs comprises substantially the same power level.

In certain embodiments, the first power level, second power level, third power level, fourth power level, fifth power level, and sixth power level, are substantially the same. By "substantially the same," Applicant means within about plus or minus ten percent. In certain embodiments, the first power level, second power level, third power level, fourth power level, fifth power level, and sixth power level, are not substantially the same.

In certain embodiments, the first frequency, second frequency, third frequency, fourth frequency, fifth frequency, and sixth frequency, are substantially the same. In certain embodiments, the first frequency, second frequency, third frequency, fourth frequency, fifth frequency, and sixth frequency, are not substantially the same. In certain embodiments, using the configuration shown in FIG. 2A electromagnetic energy radiators 241, 242, 243, 244, 245, and 246, emit electromagnetic radiation comprising frequencies of 620 Hz, 630, Hz, 12,000 Hz, 42,800 Hz, 48,800 Hz, and 100,000 Hz, respectively.

Referring now to FIG. 2B, each electrode 221, 222, 223, 224, 225, 226, 227, 228, 229, 230, 231, 232, 233, 234, 235, and 236, comprises a length 206 and width 202. In certain embodiments, length 206 is between about 6 inches and about 8 inches. As a general matter, length 206 is about [(0.5)×(width 104)]. In certain embodiments, width 202 is between about 0.1 inches and about 0.3 inches. Electrodes 221, 222, 223, 224, 225, 226, 227, 228, 229, 230, 231, 232, 233, 234, 235, and 236, comprise a height that is less than or equal to distance 107 (FIG. 1C).

Each electrode 221, 222, 223, 224, 225, 226, 227, 228, 229, 230, 231, 232, 233, 234, 235, and 236, is separated from the one or two adjacent electrodes by a gap 204. In certain embodiments, gap 204 is between about 0.2 and about 0.6 inches. As a general matter, the gap 204 is greater than or equal to width 202 and less than or equal to [2×width 202].

In the illustrated embodiment of FIG. 2A, gap 208a separates electromagnetic energy radiator 241 from electrode ends 221a, 222a, 223a, and 224a. Gap 208a separates electromagnetic energy radiator 242 from electrode ends 227a, 228a, 229a, and 230a. Gap 208a separates electromagnetic energy radiator 243 from electrode ends 233a, 234a, 235a, and 236a. Gap 208a is between about 0.25 inches and about 0.5 inches.

In the illustrated embodiment of FIG. 2A, gap 208b separates electromagnetic energy radiator 246 from electrode ends 221b, 222b, 223b, and 224b. Gap 208b separates electromagnetic energy radiator 245 from electrode ends 227b, 228b, 229b, and 230b. Gap 208b separates electromagnetic energy radiator 244 from electrode ends 233b, 234b, 235b, and 236b. Gap 208b is between about 0.25 inches and about 0.5 inches.

In certain embodiments, gap 208a and gap 208b are substantially the same. In other embodiments, gap 208a and gap 208b are not substantially the same.

Figure 3:
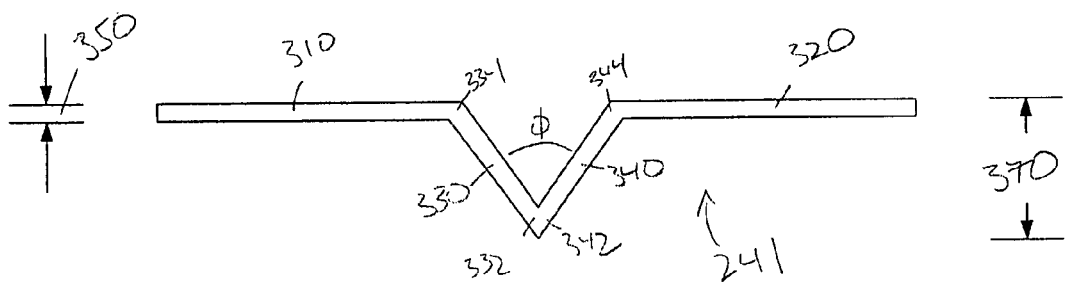
FIG. 3 is a top view of one embodiment of Applicant's electromagnetic energy radiator.

Referring now to FIG. 3, electromagnetic energy radiator 241 comprises a central V-shaped portion formed from members 330 and 340, wherein end portion 332 of member 330 is attached to end portion 342 of member 340, such that members 330 and 340 define a dihedral angle Φ wherein angle Φ is between about 30 degrees and about 45 degrees.

Member 310 is attached to end portion 334 of member 330, and extends outwardly therefrom. Member 320 is attached to end portion 344 of member 340, and extends outwardly therefrom. Member 310 comprises a length 315, wherein length 315 is between about 1 inches and about 5 inches. Member 320 comprises a length 325, wherein length 325 is between about 1 inches and about 5 inches.

In certain embodiments, length 315 is about [(2×width 202)+gap 204]. In certain embodiments, length 325 is about [(2×width 202)+gap 204]. In certain embodiments, length 315 and length 325 are substantially the same. In other embodiments, length 315 and length 325 are not substantially the same.

The afore-described V-shaped portion comprising members 330 and 340 comprises length 360, wherein length 360 is between about 0.5 inches and about 2 inches. In certain embodiments, length 360 is about [0.5×length 315].

Electromagnetic energy radiator 241 comprises a width 370. In certain embodiments, width 370 is between about 1 inches and about 3 inches. In certain embodiments, width 370 is about 0.5 times length 315.

Electromagnetic energy radiator 241 comprises an overall length 380 equal to [length 315+length 325+length 360]. In certain embodiments, overall length 380 equals [(4×width 202)+(3×gap 204)].

In certain embodiments, the plurality of electrodes are separated from adjacent electrodes by a plurality of electrically insulating spacers. For example and referring now to FIG. 4, electrodes 221 and 222 are separated by electrically-insulating spacers 401 and 402. Electrodes 222 and 223 are separated by electrically-insulating spacers 403 and 404. Electrodes 223 and 224 are separated by electrically-insulating spacers 405 and 406. Electrodes 224 and 225 are separated by electrically-insulating spacers 407 and 408. Electrodes 225 and 226 are separated by electrically-insulating spacers 409 and 410. Electrodes 226 and 227 are separated by electrically-insulating spacers 411 and 412. Electrodes 227 and 228 are separated by electrically-insulating spacers 413 and 414. Electrodes 228 and 229 are separated by electrically-insulating spacers 415 and 416. Electrodes 229 and 230 are separated by electrically-insulating spacers 417 and 418. Electrodes 230 and 231 are separated by electrically-insulating spacers 419 and 420. Electrodes 231 and 232 are separated by electrically-insulating spacers 421 and 422. Electrodes 232 and 233 are separated by electrically-insulating spacers 423 and 424. Electrodes 233 and 234 are separated by electrically-insulating spacers 425 and 426. Electrodes 234 and 235 are separated by electrically-insulating spacers 427 and 428. Electrodes 235 and 236 are separated by electrically-insulating spacers 429 and 430.

In certain embodiments, spacers 401, 402, 403, 404, 405, 406, 407, 408, 409, 410, 411, 412, 413, 414, 415, 416, 417, 418, 419, 420, 421, 422, 423, 424, 425, 426, 427, 428, 429, and 430, each comprise an electrically-insulating material. In certain embodiments, spacers 401, 402, 403, 404, 405, 406, 407, 408, 409, 410, 411, 412, 413, 414, 415, 416, 417, 418, 419, 420, 421, 422, 423, 424, 425, 426, 427, 428, 429, and 430, each comprise a dielectric strength of at least 500 volts per mil. In certain embodiments, spacers 401, 402, 403, 404, 405, 406, 407, 408, 409, 410, 411, 412, 413, 414, 415, 416, 417, 418, 419, 420, 421, 422, 423, 424, 425, 426, 427, 428, 429, and 430, are formed from a material selected from the group consisting of natural rubber, polyisoprene, polyisobutylene, polyimide, and combinations thereof.

Referring now to FIG. 5, electrode 221 is interconnected with power source 210 by power conduit 212 such that electrode 221 comprises a cathode. In the illustrated embodiment of FIG. 5, power conduit 510 interconnects electrodes 221, 223, 225, 227, 229, 231, 233, and 235, such that electrodes 221, 223, 235, 227, 229, 231, 233, and 235, each comprise a cathode.

Electrode 236 is interconnected with power source 210 by power conduit 214 such that electrode 236 comprises an anode. In the illustrated embodiment of FIG. 5, power conduit 520 interconnects electrodes 222, 224, 226, 228, 230, 232, 234, and 236, such that electrodes 222, 224, 226, 228, 230, 232, 234, and 236, each comprise an anode.

While the preferred embodiments of the present invention have been illustrated in detail, it should be apparent that modifications and adaptations to those embodiments may occur to one skilled in the art without departing from the scope of the present invention as set forth in the following claims.

I claim:

1. An electrolysis apparatus, comprising: an enclosure containing an aqueous solution and comprising a bottom, a plurality of walls attached to said bottom and having distal ends extending upwardly therefrom, and a top assembly removeably attached to each of the distal ends of said plurality of walls, wherein said bottom, plurality of walls, and top define an enclosed space; a first electrode disposed within said enclosed space; a second electrode disposed within said enclosed space; a plurality of electromagnetic energy radiators disposed within said enclosed space; a power source disposed external to said enclosure, wherein said power source is interconnected with said first electrode such that said first electrode comprises a cathode, and wherein said power source is interconnected with said second electrode such that said second electrode comprises an anode; a plurality of oscillators disposed external to said enclosure, wherein each oscillator is interconnected to said a different electromagnetic energy radiator, wherein each electromagnetic energy radiator emits electromagnetic energy having a frequency between 620 Hertz and 100,000 Hertz.

2. The apparatus of claim 1, wherein said first electrode is formed from a metal selected from the group consisting of nickel, tin, iron, lead, and combinations thereof.

3. The apparatus of claim 2, wherein said first electrode comprises Nickel (II) hydroxide.

4. The apparatus of claim 3, wherein said first electrode further comprises Nickel (III) oxide-hydroxide.

5. The apparatus of claim 1, wherein said second electrode is formed from a metal selected from the group consisting of nickel, tin, iron, lead, and combinations thereof.

6. The apparatus of claim 5, wherein said second electrode comprises Nickel (II) hydroxide.

7. The apparatus of claim 6, wherein said second electrode further comprises Nickel (III) oxide-hydroxide.

8. The apparatus of claim 1, wherein:
said first electrode comprises a planar member comprising Nickel (II) hydroxide and Nickel (III) oxide-hydroxide;
said first electrode comprises a thickness of about 0.125 inches;
said second electrode comprises a planar member comprising Nickel (II) hydroxide and Nickel (III) oxide-hydroxide;
said first electrode comprises a thickness of about 0.125 inches;
said first electrode is separated from said second electrode by a gap of about 0.1875 inches.

9. The apparatus of claim 1, further comprising:
a water input port extending through said enclosure; and
a float valve disposed within said enclosure, wherein said float valve assembly is in fluid communication with said water input port.

10. The apparatus of claim 9, further comprising a gas outlet port extending through said top assembly.

11. The apparatus of claim 10, wherein said water input port is connected with a water source, said apparatus further comprising water disposed within said enclosure, wherein said float valve maintains a water level sufficient to completely cover said first electrode and said second electrode.

12. The apparatus of claim 1, further comprising:
(N) first electrodes, wherein (N) is greater than or equal to 3;
(N) second electrodes;
wherein the (i)th first electrode is disposed between 2 second electrodes, wherein (i) is greater than or equal to 2 and less than or equal to (N−1); and
wherein the (j)th second electrode is disposed between 2 first electrodes, wherein (j) is greater than or equal to 2 and less than or equal to (N−1).

13. The apparatus of claim 1, further comprising:
(M) electromagnetic energy radiators, wherein (M) is greater than 2;
(M) oscillators;
wherein the (m)th electromagnetic energy radiator is interconnected with the (m)th oscillator, wherein (m) is greater than 2 and less than or equal to (M).

14. The apparatus of claim 13, wherein (M) is 6.

15. The apparatus of claim 14, wherein:
a first oscillator provides first energy comprising a frequency of 620 Hz to a first electromagnetic energy radiator;
a second oscillator provides second energy comprising a frequency of 630 Hz to a first electromagnetic energy radiator;
a third oscillator provides third energy comprising a frequency of 12,000 Hz to a third electromagnetic energy radiator;
a fourth oscillator provides fourth energy comprising a frequency of 42,800 Hz to a fourth electromagnetic energy radiator;
a fifth oscillator provides fifth energy comprising a frequency of 48,000 Hz to a fifth electromagnetic energy radiator; and
a sixth oscillator provides second sixth comprising a frequency of 100,000 Hz to a sixth electromagnetic energy radiator.

16. The apparatus of claim 15, wherein:
said first energy comprises a first power level, wherein said first power level is between 1 watt and 1000 watts;

said second energy comprises a second power level, wherein said second power level is between 1 watt and 1000 watts;
said third energy comprises a third power level, wherein said third power level is between 1 watt and 1000 watts;
said fourth energy comprises a fourth power level, wherein said fourth power level is between 1 watt and 1000 watts;
said first energy comprises a fifth power level, wherein said fifth power level is between 1 watt and 1000 watts;

said sixth energy comprises a sixth power level, wherein said sixth power level is between 1 watt and 1000 watts.

17. The apparatus of claim 16, wherein said first power level, said second power level, said third power level, said fourth power level, said fifth power level, and said sixth power level, are about 600 watts.

* * * * *